(12) United States Patent
Li

(10) Patent No.: US 6,327,392 B1
(45) Date of Patent: Dec. 4, 2001

(54) METHOD OF VISUAL PROGRESSIVE CODING

(75) Inventor: Jin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/252,245

(22) Filed: Jan. 28, 1999

(51) Int. Cl.⁷ .............................. G06K 9/36; H04N 11/02
(52) U.S. Cl. ............................................ 382/248; 348/438
(58) Field of Search .................................... 382/253, 248, 382/280, 302; 348/408, 437, 438, 409

(56) References Cited

U.S. PATENT DOCUMENTS

| | | | |
|---|---|---|---|
| 4,780,761 | * 10/1988 | Daly et al. ............................ | 358/133 |
| 4,939,645 | 7/1990 | Hopkinson . | |
| 5,144,688 | 9/1992 | Bovir et al. . | |
| 5,321,776 | 6/1994 | Shapiro . | |
| 5,426,512 | 6/1995 | Watson . | |
| 5,442,399 | * 8/1995 | Asamura .............................. | 348/394 |
| 5,629,780 | 5/1997 | Watson . | |
| 6,205,256 | * 3/2001 | Chaddha .............................. | 382/253 |
| 6,266,817 | * 7/2001 | Chaddha .............................. | 725/146 |

FOREIGN PATENT DOCUMENTS

407203456 * 4/1995 (JP) ................................ H04N/7/32

OTHER PUBLICATIONS

J. Shapiro, "Embedded image coding using zero tree of wavelet coefficients", *IEEE Trans. On Signal Processing*, vol. 41, pp. 3445–3462, Dec. 1993.

D. Taubman and A. Zakhor, "Multirate 3–D subband coding of video", *IEEE Trans. On Image Processing*, vol. 3, No. 5, Sep. 1994, pp. 572–588.

A. Said, and W. Pearlman, in "A new, fast and efficient image codec based on set partitioning in hierarchical trees", *IEEE Trans. On Circuit and System for Video Technology*, vol. 6, No. 3, Jun. 1996, pp. 243–250.

H. Wang and C. J. Kuo, "A multi–threshold wavelet coder (MTWC) for high fidelity image", IEEE International Conference on Image Processing '1997, pp. 652–655.

J. Li and S. Lei, "An embedded still image coder with rate–distortion optimization", *SPIE: Visual Communication and Image Processing*, vol. 3309, pp. 36–47, San Jose, CA, Jan. 1998.

Jones, Daly, Gaborski and Rabbani, Comparative study of wavelet and DCT decompositions with equivalent quantization and encoding strategies fro medical images, SPIE V. 2431, Proceedings of Conference Medical Imaging, pp. 571–582, 1995.

* cited by examiner

*Primary Examiner*—Jerome Grant, II
(74) *Attorney, Agent, or Firm*—Robert D. Varitz, PC

(57) ABSTRACT

A method of visual progressive coding for an image includes transforming the image into a set of transform coefficients; dividing the set of transform coefficients into bands, wherein each band includes a group of transform coefficients having the same visual characteristics; assigning a set of active weights to each band; generating coding units; identifying a set of candidate coding units; determining the significance of each candidate coding unit; determining the visual significance of each candidate coding unit; encoding those candidate coding units having the largest visual significance; and updating the active weights.

26 Claims, 15 Drawing Sheets

|     | $b_1$ | $b_2$ | $b_3$ | $b_4$ | $b_5$ | $b_6$ | $b_7$ |       | Sign |
|-----|-------|-------|-------|-------|-------|-------|-------|-------|------|
| $w_0$ | 0 | 1 | 0 | 1 | 1 | 0 | 1 | •••  | + |
| $w_1$ | 1 | 0 | 0 | 1 | 0 | 1 | 0 | •••  | − |
| $w_2$ | 0 | 0 | 1 | 0 | 1 | 0 | 1 | •••  | + |
| $w_3$ | 0 | 0 | 0 | 1 | 1 | 1 | 0 | •••  | + |
| $w_4$ | 0 | 0 | 0 | 0 | 1 | 0 | 0 | •••  | − |
| $w_5$ | 0 | 0 | 1 | 0 | 0 | 1 | 0 | •••  | − |
| $w_6$ | 0 | 0 | 0 | 0 | 1 | 0 | 0 | •••  | + |
| $w_7$ | 0 | 0 | 0 | 0 | 0 | 0 | 1 | •••  | − |

| | $b_1$ | $b_2$ | $b_3$ | $b_4$ | $b_5$ | $b_6$ | $b_7$ | | Sign |
|---|---|---|---|---|---|---|---|---|---|
| $w_0$ | 0 | 1 | 0 | 1 | 1 | 0 | 1 | ... | + |
| $w_1$ | 1 | 0 | 0 | 1 | 0 | 1 | 0 | ... | − |
| $w_2$ | 0 | 0 | 1 | 0 | 1 | 0 | 1 | ... | + |
| $w_3$ | 0 | 0 | 0 | 1 | 1 | 1 | 0 | ... | + |
| $w_4$ | 0 | 0 | 0 | 0 | 1 | 0 | 0 | ... | − |
| $w_5$ | 0 | 0 | 1 | 0 | 0 | 1 | 0 | ... | − |
| $w_6$ | 0 | 0 | 0 | 0 | 1 | 0 | 0 | ... | + |
| $w_7$ | 0 | 0 | 0 | 0 | 0 | 0 | 1 | ... | − |

METHOD OF VISUAL PROGRESSIVE CODING

FIELD OF THE INVENTION

This invention relates to the process of embedded coding in video images, and specifically to a method of improving the visual quality of the embedded coding, and providing embedded coding with flexible visual control.

BACKGROUND OF THE INVENTION

In the embedded coding, the coding bitstream may be truncated and may be used in a variety of bit rate ranges. The viewing condition, or appearance, of the high bit rate will be substantially different from that of a low bit rate. Visual Progressive Coding (VPC) provides a mechanism and a method to adjust the viewing condition across the entire coding bit rate so that a better subjective image may be obtained over all the bit rate range.

Visual weighting has proven itself to be an effective tool to improve the subjective quality of an encoded image. By allocating more bits to coefficients in the visual sensitive frequency band and less bits to coefficients in the visual insensitive band, visual weighting emphasizes those features which are more perceivable by the human eyes, and improves the subjective quality of the image. Traditionally, visual weighting may be implemented in one of two ways: by multiplying/dividing the transform coefficients with a model of the contrast sensitivity function (CSF) of the visual system:

$$\hat{f}_{ij} = f_{ij} W_{ij} \qquad (1)$$

and then quantizing and entropy encoding the weighted coefficient $\hat{f}_{ij}$, or by adjusting the quantization step size to the inverse of the CSF function:

$$x_{i,j} = Q\left[\frac{f_{i,j}}{q_i}\right], \quad q_i \propto \frac{1}{w_i} \qquad (2)$$

(1) and (2) are known as the fixed visual weighting scheme, where $f_{ij}$ and $\hat{f}_{ij}$ are the transform coefficient, without and with, respectively, visual weighting, $x_{ij}$ is the quantized coefficient, i indexes the frequency band, and j is a position within the band i. q is the quantization step size associated with the band i, and is adjusted to be inversely proportional to the weight, Q is a quantizer. $w_i$ is a weighting factor associated with the frequency component of coefficient $x_i$ and the viewing condition. The weight $w_i$ may be derived from a contrast sensitivity function (CSF) model of the visual system and the distance the image is to be viewed. In many embedding schemes, there is no quantization operation, in such a case implementation (1) may be used. It is usually assumed that the visual weighting factor $w_i$ is fixed during the entire coding process. Such schemes are known as "fixed visual weighting". For schemes explicitly involving a quantization operation, such as JPEG, operation (2) is simpler, and is widely adopted. Because the implementation of fixed visual weighting is rather simple, most of the existing research on visual optimized coding focuses on the derivation of the weighting factor, $w_i$, from the viewing distance, as disclosed in the references cited herein.

To summarize, coding may be implemented as a two step operation: (A) transform and entropy coding; or as a three step operation: (B) transform, quantization and entropy coding. Method A is used for many embedded coders. A separate implementation of fixed visual weighting is required for the two types of coding: for method A, implementation (1) is used and for method B, implementation (2) is used.

One of the recent achievements in image coding is embedded coding. An embedded coder, such as the Embedded Zero tree Wavelet coding (EZW), J. Shapiro, "Embedded image coding using zero tree of wavelet coefficients", *IEEE Trans. On Signal Processing*, vol. 41, pp.3445–3462, December 1993, has the ability to generate a coding bitstream which may be truncated in a subsequent processing step and which may still be decoded to reveal a visually perceptible image. The embedded coder has important applications in internet image browsing, image database, digital camera, etc.

Using internet image browsing as an example, with the embedded coding, only one version of the compressed image need be stored in a central database. A user may first request only a small portion of the bitstream for each image, so that the user may quickly browse through a large number of images at low fidelity. When the image of interest is found, the user may then request the remainder of the bitstream and bring the image to full resolution and fidelity. The EZW technique encodes the image bitplane-by-bitplane, and within each bitplane, it uses a zerotree structure to group the insignificant coefficients and to efficiently encode them.

There have been a number of other publications and patents in the area of embedded coding. One of the well known references in the field include the layered zero coding (LZC) proposed by D. Taubman and A. Zakhor, "Multirate 3-D subband coding of video", *IEEE Trans. On Image Processing*, Vol. 3, No. 5, September 1994, pp.572–588. An embedded coding approach, called Layered Zero Coding (LZC) is described. The scheme encodes the transformed coefficient bitplane-by-bitplane with context adaptive arithmetic coding. It achieves better rate-distortion performance than EZW, however, no human visual characteristic is considered in the paper. In addition to a superior performance, the coding bitstream generated by LZC may be organized into progressive-by-quality or progressive-by-resolution, which provides additional flexibility for the embedding process.

Set Partitioning In Hierarchical Trees (SPIHT) is proposed by A. Said, and W. Pearlman, in "A new, fast and efficient image codec based on set partitioning in hierarchical trees", *IEEE Trans. On Circuit and System for Video Technology*, Vol. 6, No. 3, June 1996, pp. 243–250. SPIHT redefines the grouping of insignificant coefficient and achieves a superior performance compared with the EZW. Moreover, one mode of SPIHT eliminates the entropy coder, which makes the encoder and decoder very simple. Again, no human visual characteristic is considered.

H. Wang and C. J. Kuo, "A multi-threshold wavelet coder (MTWC) for high fidelity image", *IEEE International Conference on Image Processing* '1997, discloses a scheme which provides an improvement over the LZC by first encoding the wavelet coefficients with the largest threshold value. No human visual characteristics is considered in the scheme.

J. Li and S. Lei, "An embedded still image coder with rate-distortion optimization", *SPIE: Visual Communication and Image Processing*, volume 3309, pp. 36–47, San Jose, Calif., January 1998 discloses a scheme which optimizes the performance of the embedded coder by first encoding the coding units with the largest rate-distortion slope, i.e., the largest distortion decrease per coding bit spent. A rate-distortion optimized embedding coder (RDE) is disclosed, which provides a smooth rate-distortion curve and improves the performance of SPIHT and LZC. Still, the human visual system is not considered in the scheme.

Jones, Daly, Gaborski and Rabbani, Comparative study of wavelet and DCT decompositions with equivalent quantization and encoding strategies fro medical images, SPIE V. 2431, Proceedings of Conference Medical Imaging, pp. 571–582, 1995, disclosed techniques calculating visual weights.

U.S. Pat. No. 5,426,512, to A. Watson, for "Image data compression having minimum perceptual error", describes a method which adapts or customizes the DCT quantization matrix according to the image being compressed. The method may only be used for fixed rate coding.

U.S. Pat. No. 5,629,780, to A. Watson, for "Image data compression having minimum perceptual error", describes a method wherein the quantization matrix is adjusted with the visual masking by luminance and contrast techniques and by an error pooling technique. It is used for compressing an image at a fixed visual condition.

U.S. Pat. No. 4,780,761, to S. Daly et al., for "Digital image compression and transmission system visually weighted transform coefficients", discloses a system to quantitize the transform coefficients according to a two-dimensional model of the sensitivity of the human visual system. The model of the human visual system is characterized as being less sensitive to diagonally oriented spatial frequencies than to horizontally or vertically oriented spatial frequencies, thereby achieving increased compression of the image. It is again for use in a fixed viewing condition.

U.S. Pat. No. 5,144,688, to A. Bovir, et al., for "Method and apparatus for visual pattern image coding", describes a sub-band compression system. The image is separated into a plurality of sub-bands. A perceptual matrix is determined based on the properties of the sub-band filters, quantizer error distribution, and properties of the human visual system. This perceptual matrix is used to adjust the quantizer used in encoding each sub-band signal. Again, the teaching is directed towards a fixed viewing condition.

U.S. Pat. No. 4,939,645, to J. Hopkinson, for "Method and apparatus to reduce transform compression visual artifacts in medical images", describes a method for coding and decoding digital images by partitioning the images into blocks, and coding each image separately according to visually significant responses of the human eye. Coding is achieved by calculating and subtracting a mean intensity value from digital numbers within each block or partition and detecting visually perceivable edge locations within the resultant residual image block. If a visually perceivable edge is contained within the block, gradient magnitude and orientation at opposing sides of the edge within each edge block are calculated and appropriately coded. If no perceivable edge is contained within the block, the block is coded as a uniform intensity block. Decoding requires receiving coded mean intensity value, gradient magnitude and pattern code, and then decoding a combination of these three indicia to be arranged in an orientation substantially similar to the original digital image. The viewing condition is fixed.

U.S. Pat. No. 5,321,776, to J. Shapiro, for "Data compression system including successive approximation quantizer", presents a data processing system with successive refinement quantization and entropy coding to facilitate data compression. The generated compressed bitstream may be truncated at any time and still produce perceptible images. The bitstream is arranged to achieve progressive-by-quality, i.e., to minimize the mean square error at the point of truncation. Human visual characteristics are not considered in the scheme.

Fixed visual weighting may be easily incorporated in an embedded coder through multiplying/dividing the transform coefficients with a model of the contrast sensitivity function (CSF) of the visual system. However, in the case of an embedded coder, the coding bitstream may be truncated at some later time, and the viewing condition at different stages of embedding may be very different. At a low bit rate, the quality of the compressed image is poor and the detailed image features are not available. The image is usually viewed at a relatively far distance and the observer is more interest in the global features. As more and more bits are received, the image quality improves, and the observer may be interested in not only the global features but also the details of the image. The image is examined at a closer distance, it may be also subjected to image analysis, or even be blown up for examination, which equivalently decreases the viewing distance. Thus, different viewing conditions are called for at different stages of the embedding.

SUMMARY OF THE INVENTION

A method of visual progressive coding for an image includes transforming the image into a set of transform coefficients; dividing the set of transform coefficients into bands, wherein each band includes a group of transform coefficients having the same visual characteristics; assigning a set of active weights to each band; generating coding units; identifying a set of candidate coding units; determining the significance of each candidate coding unit; determining the visual significance of each candidate coding unit; encoding those candidate coding units having the largest visual significance; and updating the active weights.

It is an object of the invention to provide a method of coding which will allow a user to observe a low-resolution, low-quality image prior to deciding to request a full resolution, high quality image.

Another object of the invention is to apply a visual progressive coding technique to a rate-distortion optimized embedding technique.

A further object of the invention is to apply visual progressive coding on a subband or DCT index level.

These and other objects and advantages will become more fully apparent as the description which follows is read in conjunction with the drawings.

BRIEF DESCRIPTION OF THE DRAWINGS

FIG. 2 depicts a bit array and coding order of a conventional encoding method.

FIG. 3 depicts a bit array and coding order of the encoding method of the invention.

DETAILED DESCRIPTION OF THE PREFERRED EMBODIMENTS

Figure 1:
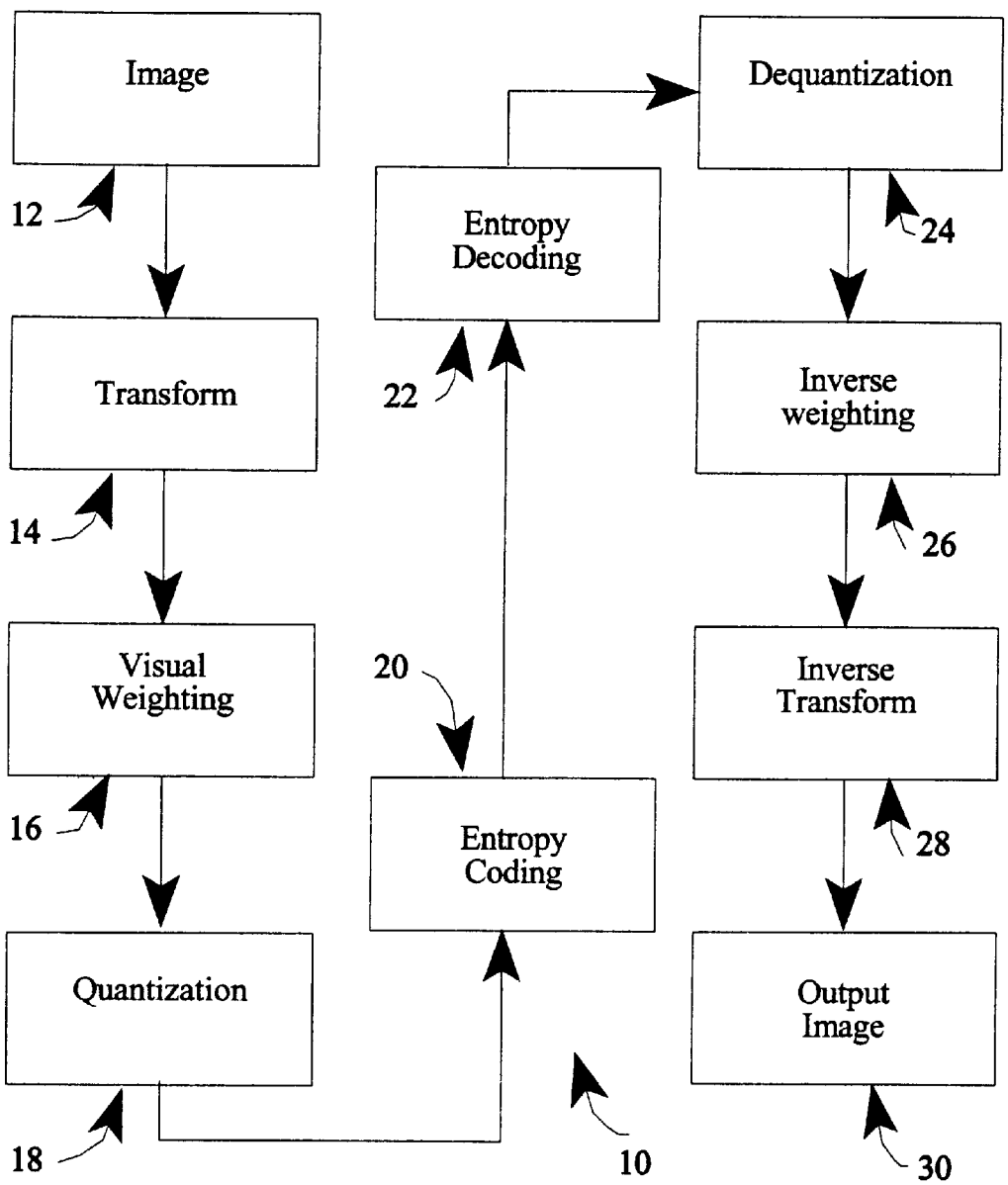
FIG. 1 is a block diagram of a prior art visual weighting method in a typical coded framework.

The invention described herein is a visual weighting method denoted as the visual progressive coding (VPC). VPC does not multiply the transform coefficients by the weights or adjust the quantization step sizes inversely proportional to the weights as in the prior art. Instead, it uses the weights to change the order of embedding. A number of weights may be used during the VPC coding process, and each time a new set of weights is active, VPC reorders the rest of the bitstream according to the new weights. The new weights will not affect the order of the bitstream that has already been coded. VPC may be implemented upon any existing embedded coders and provide flexible visual adjustment for the entire embedded coding.

VPC improves the subjective quality of embedded coding. In embedded coding, the coding bitstream may be truncated during later processing, and may still decode a perceptible image. The viewing condition at a high bit rate will be very different from the viewing conditions at a low bit rate. The visual progressive coding method of the invention provides a method to adjust the viewing condition across the entire coding bit rate to obtain a better subjective image.

If the embedded coded image is to be viewed at a specific distance, visual weighting may be easily incorporated into the coder by multiplying the transform coefficients with the weight $w_i$. However, different viewing conditions may be called for at different stages of embedding. Using image database query as an example, with the embedding functionality, only one version of the compressed bitstream is stored in the central database. The user first requests only a small portion of the bitstream of each image quickly to browse through a large number of images at low resolution and fidelity, for example, $1/16^{th}$ screen per image. When an image of interest is found, the user previews the image at full screen resolution. If the user finds the image to be satisfactory, the user may requests the full losslessly compressed image to be analyzed and printed. During the query process, the viewing condition of the image changes. The image is enlarged, or viewed closer and closer, as more and more bits are received. At a low bitrate, the image is usually viewed at a relatively far distance. The user is more interested in the global feature because the quality of the compressed image is poor and the detail image feature is not available anyway. The image quality improves as more bits are received, and the user becomes interested in not only the global features but also the details of the image. As the image is examined at a "closer" distance, it may undergo image analysis operation, or may even be blown up for examination, which equivalently decreases the viewing distance. Implementing changing weights with either (1) or (2) is clumsy, because the coefficients must be multiplied with a new weight, or be requantized every time the weights change. Furthermore, such implementation changes the binary representation of the coefficient sent to the entropy coder each time the weights change, and the performance of the subsequent entropy coder may degrade due to the changing statistics.

Subjective visual weighting has proven itself to be an effective way to improve the subjective quality of an encoded image. Referring to FIG. 1, a flowchart of a prior art visual weighting scheme is depicted generally at 10. Traditionally visual weighting of an image 12 is implemented in one of two ways: it may be implemented by multiplying/dividing a model of the contrast sensitivity function (CSF) of the visual system to the transform coefficients, block 14, as indicated by the visual weighting, block 16, using (1); or, the visual weighting may be integrated with the quantization operation, block 18, using (2).

The weighted coefficients are then entropy coded, block 20. The image is decoded by first entropy decoding, block 22, dequantitizing the weighted coefficients, block 24, inversely weighting, block 26, and applying an inverse transform, block 28, resulting in an output image 30. Alternately, the visual weighting may be integrated with the inverse quantization operation by adjusting the quantization step size inversely proportionately to the weight.

At a low bit rate, only the global features of an image are of interest and the image may be viewed at what appears to be a relatively far distance. The detail feature is not available due to the insufficient bit rate. However, at a high bit rate, the image may be examined in detail and viewed at what appears to be a relatively close distance. It may even be enlarged for analysis. Thus, different stages of embedding call for different visual weighting. No implementation of a known embedded coder is able to adjust the visual weighting factor during the process of embedding.

The syntax and the specific implementations for an adjustable weighting embedded coder will now be described. The syntax enables the weighting factor to be adjusted during the process of embedding. Such a coder is referred to herein as a visual progressive coder (VPC), and the process as visually progressing coding (also VPC). Several embodiments of the VPC will be described.

VISUAL PROGRESSIVE CODING (VPC)

Visual progressive coding (VPC) enables flexible adjustment of the visual weighting factor during the embedding process. With the functionality of VPC, the coder may take advantage of the visual weighting at low bit rate, assign more bits to the low pass coefficients, and improve the global appearance of the image. At high bit rate, VPC phases out the visual weighting to accommodate a more flexible viewing condition and to keep the high frequency image details. VPC improves the subjective quality of the embedded coding. Rather than multiplying/dividing the coefficient by the visual weight, or adjusting the quantization step size according to visual weighting, VPC adjusts the embedding order according to the visual weight. In other words, VPC uses the visual weighting to control the coding order, rather than the coding content.

Implementation of Visual progressive coding

In visual progressive coding (VPC), the image is first transformed into a set of coefficients, where the transform may be DCT (discrete cosine transform), wavelet or even wavelet packet. Without loss of generality, a "band" is defined in VPC as a group of transform coefficients having the same visual characteristics. In the wavelet/wavelet packet transform, a band is just a wavelet/wavelet packet subband; in DCT, a band includes all coefficients of the same DCT basis. The transform coefficient is indexed as $f_{i,j}$, where i indexes the band, and j is a position within the band i. The binary representation of the transform coefficient $f_{ij}$ is:

$$\pm b_1, b_2, b_3, \ldots, b_n, \ldots b_L \qquad (3)$$

where $b_1$ is the most significant bit, and $b_L$ is the least significant bit, and $b_u(f_{i,j})$ is the u-th most significant bit or the u-th coding layer of coefficient $f_{i,j}$. A sample bit array produced by a transform is shown in FIG. 2, in which each row of the bit array represents a transform coefficient, and each column of the bit array represents a coding layer. The most significant bit is placed in the left most column, and the least significant bit is placed in the right most column. It is apparent that a more significant bit $b_u(f_{i,j})$ should always be coded before a less significant bit $b_v(f_{i,j})$, when u<v. Bit $b_u(f_{i,j})$ is denoted as a candidate bit if it is the most significant unencoded bit, i.e., if all of the more significant bits of the same coefficient $b_v(f_{i,j})$, v=1, . . . , u−1, have already been encoded. At any given moment, the coder has to select the next bit to encode from the set of candidate bits.

A coefficient is significant if any of its coded bits is non-zero, otherwise the coefficient is considered insignificant. The candidate bit of an insignificant coefficient is coded in the mode of significance identification, the candidate bit of a significant coefficient is coded in the mode of refinement. Significance identification and refinement are further discussed later herein.

The conventional and the embedded coder differ in the order of encoding the bit array. The conventional coder, such as JPEG or MPEG, first determines the quantization precision, or equivalently, the number of bits to encode for each coefficient, then sequentially encodes one coefficient after another. Using the bit array as an example, the conventional coding is ordered row-by-row as shown in FIG. 2, generally at 32. In the example of FIG. 2, rows $w_0$ to $w_7$ contain bits in bitplanes $b_1$, to $b_7$. Each row has a + or − sign associated therewith.

The embedded coding of FIG. 3, shown generally at 34, differs from the conventional coding as the image is coded bit-plane by bit-plane, or column by column. The embedding bitstream may be truncated and still maintain reasonable image quality because the most significant part of each coefficient is coded first. It is also suited for progressive image transmission because the quality of the decoded image gradually improves as more and more bits are received.

In VPC, there are many sets of visual weights:

$$w^{(0)} = \{w_0^{(0)}, w_1^{(0)}; \ldots, w_n^{(0)}\};$$

$$w^{(1)} = \{w_0^{(1)}, w_1^{(1)}; \ldots, w_n^{(1)}\};$$

$$\ldots$$

$$w^{(m)} = \{w_0^{(m)}, w_1^{(m)}; \ldots, w_n^{(m)}\}. \quad (4)$$

There may be an optional global weighting set wg which is applied right after the transform operation and is in additional to the VPC weighting series:

$$wg = \{wg_0, wg_1, \ldots, wg_n\} \quad (5)$$

The global weighting set is implemented with fixed visual weighting. At any given moment, one set of weights, which is denoted as active weights w, will be in effect:

$$w = \{w_0, w_1, \ldots, w_n\} \quad (6)$$

where $w_i$ is the active weight for band i. The key concept of the VPC is instead of weighting the transform coefficient, as in implementation (1), or adjusting the quantization step inverse proportional to the weights as in implementation (2), VPC uses the weights to control the order of embedding. The smallest unit of reordering in VPC is known as a coding unit (CU), which is indexed by k. Depending on the specific embedding scheme upon which the VPC is implemented, the CUs are different. A candidate CU is defined to be a coding unit which consists of only candidate bits. Because only candidate CUs may be coded, the operation of VPC is to order the candidate CUs according to the active weights. When a new weighting set is active, VPC forms a new coding order for the remaining CUs. The coding order of CUs that have already been coded will not be affected by the new weights. It is the "reordering by weights" strategy that enables VPC to incorporate a number of weighting sets during the embedding process.

Figure 4:
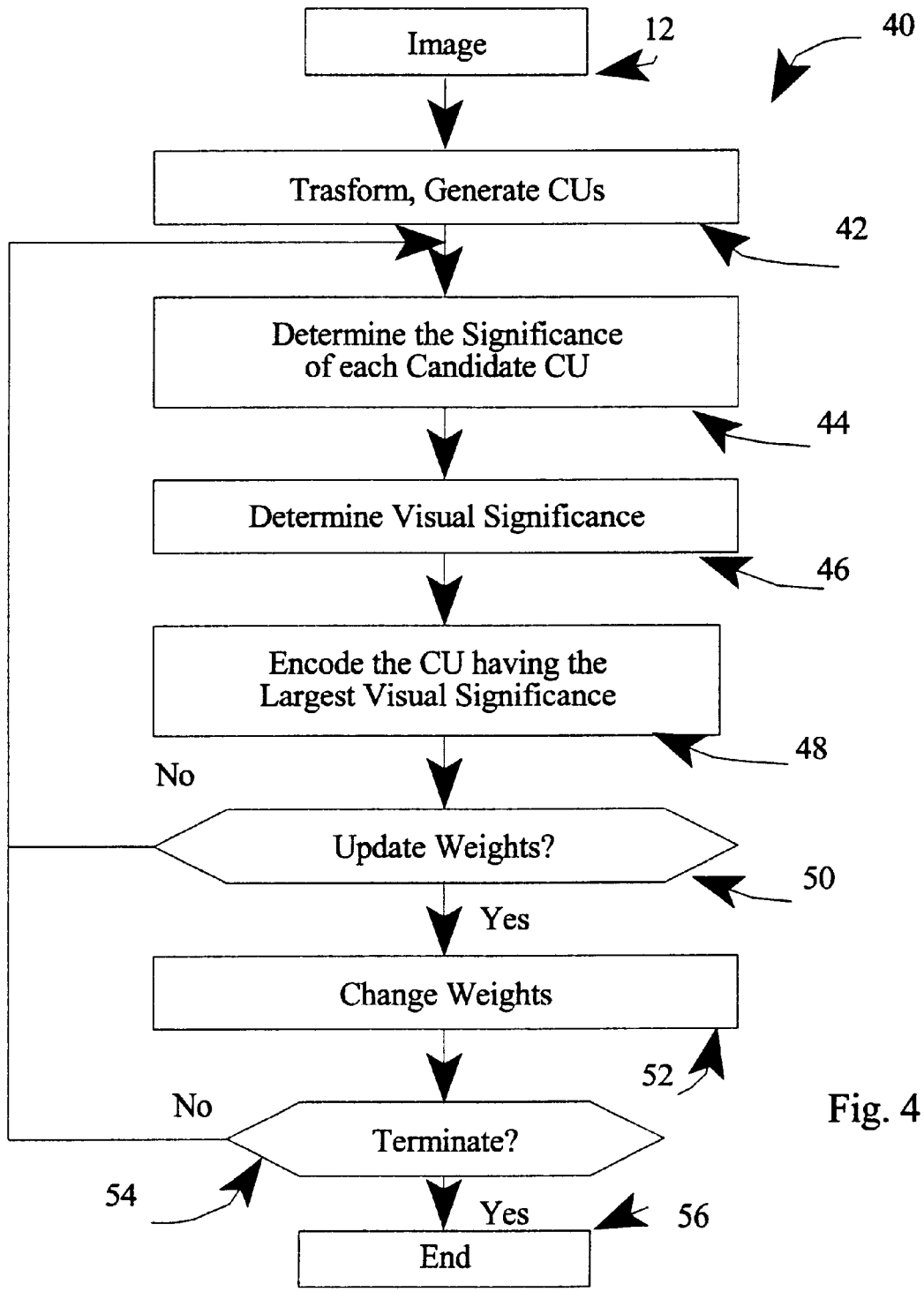
FIG. 4 is a block diagram of the method of the invention.

A general operation flowchart of the VPC method of the invention is shown generally at 40 in FIG. 4. Beginning with input image 12, the image is transformed and the CUs are generated, block 42. After the transform, if there is a global weighting set wg, it is applied with fixed visual weighting using either implementation (1) or (2). Active weight set w is initialized, and the bits of transform coefficients are grouped to generate the CUs. VPC identifies the candidate CUs and determines their significance $s_k$, block 44, which is a magnitude value related to the order of embedding without visual weighting. After that, the visual significance $V_{s_k}$ of the CU is determined, block 46, by multiplying the significance of the CU by its weight:

$$v_{s_k} = s_k \cdot w_i \quad (7)$$

where $w_i$ is the active weight of the band where the CU resides. VPC encodes the CU with the largest visual significance, block 48. After a CU has been encoded, new candidate CUs may emerge. VPC then evaluates the significance and the visual significance of the newly emerged candidate CUs and selects to encode the one with the largest visual significance. A determination of whether the weights should be updated is made, block 50. If "yes", the process goes to the next step; otherwise, it repeats using the same weights, beginning at block 44. Active weights may change, block 52, any time, and when a set of new weights becomes active, it just affects the embedding order of the remaining CUs. The changing of weights has to be negotiated between the encoder and the decoder, and there are several viable approaches, as will be described later herein as the syntax of VPC. The coding process repeats until some termination criterion is satisfied, block 54, such as all CUs have been encoded, i.e., the coding reaches losslessly; a final coding rate has been reached; or, the coding distortion is smaller than a certain threshold, and the process ends, block 56. If the termination criterion is not satisfied, the process repeats, beginning with block 44.

Visual Progression on Individual Bits—Visual Progressive Rate-Distortion Optimized Embedding (VPC RDE)

The rate-distortion optimized embedding (RDE) was developed by Li and Lei, as noted above. In RDE, the CU is a just single bit $b_u(f_{i,j})$ of a transform coefficient $f_{i,j}$. RDE encodes the candidate bits in the order of their expected rate-distortion (R-D) slope, i.e., the distortion reduction per coding bit:

$$slope_{ij} = \frac{E[\Delta D_{ij}]}{E[\Delta R_{ij}]} \quad (8)$$

In order to reduce the computational complexity, a lookup table is developed so that the calculation of the R-D slope for each candidate bit is just a single lookup table operation with its coding layer, significant status, and arithmetic coding context as index.

To implement VPC for RDE, the CU, i.e., the individual bits of coefficients are encoded in a descending order of visual significance. The significance of the CU is defined as the square root of its R-D slope:

$$s_{ij} = \sqrt{slope_{ij}} \quad (9)$$

The square root is applied because the R-D slope is an energy reduction measure, while the significance of a CU is a magnitude measure. Because the number of CUs is very large, the CUs are not strictly searched and encoded with the maximum visual significance, instead, a threshold approach is used. A set of decreasing thresholds is defined as: $\gamma_0 > \gamma_1 > \ldots > \gamma_n > \ldots$. A typical threshold sequence reduces itself by a factor of $\alpha$ for each iteration:

$$\gamma_n = \gamma_0 \cdot \alpha^{-n} \quad (10)$$

VPC RDE scans the transformed coefficients multiple times, and at scan n, all CUs with visual significance greater than Yn are encoded. Because the active weight is the same within band i, instead of calculating the visual significance of each coefficient and comparing it to the current threshold, the threshold for band i is inversely weighted:

$$\gamma'_i = \frac{\gamma^2}{w_i^2}, \quad (11)$$

and encode all candidate bits with visual significance greater than the adjusted threshold $\gamma'_i$. The steps of VPC RDE are:

Step 1. Image transform.

Step 2. Fixed visual weighting: applying the global weights wg, when available.

Step 3. Setting the initial threshold $\gamma = \gamma_0$ and active weights w.

Step 4. Scanning and Coding.

The image initially is scanned from the lowest resolution band to the highest resolution band, with raster line order within each band. For band i, the weighted threshold $\gamma'_i$ is calculated according to (11). For each candidate bit, its R-D slope is determined from a lookup table operation within its coding layer, significant status, and arithmetic coding context as index, as described in the RDE reference of Li and Lei. The R-D slope of the candidate bit is compared with the adjusted threshold $\gamma'_i$, and only the bit having a R-D slope greater than the adjusted threshold is encoded.

Step 5. Update the active weights as necessary.

Step 6. Reduce threshold: after scanning the entire image, the threshold $\gamma$ is reduced by a factor of $\alpha : \gamma \leftarrow \gamma/\alpha$ and the coding goes back to Step 4, continuing until a termination condition has been satisfied, such condition may be the reaching of a final bit rate as selected by the user, e.g., a 2.0 bpp rate.

Visual Progressive Coding on a Subband or DCT index level.

For bitplane embedding schemes, such as the layered zero coding (LZC) proposed by Taubman and Zakhor, the compression with reversible embedded wavelets (CREW) proposed by Zandi et al, and the multi-threshold wavelet coder (MTWC) proposed by Wang and Kuo, a VPC CU may be just a band bitplane, which includes all bits in the same coding layer and of the same band, which bitplane structure already exists in MTWC. By enlarging the CU, the granularity of reordering is increased, however, the implementation is less complex, as most part of the coder remains the same. A VPC implementation of this category is demonstrated with implementation of VPC in JPEG 2000 VM2 as follows.

In JPEG 2000 VM2, the quantized coefficients are coded by a partial bitplane arithmetic coder. Within a band bitplane, the bits are further grouped into three partial bitplanes, or three sub-modes: (1) the predicted significance mode, where the current coefficient is insignificant, but at least one of its neighbor coefficients is significant; (2) the refinement mode, where the current coefficient is significant; (3) predicted insignificance mode, where the current coefficients and all of its neighbor coefficients are insignificant. Within a band, the coder always proceeds from the most significant bitplane to the least significant bitplane, and within a band bitplane, the coder always encodes first the predicted significance mode, then the refinement mode, and finally the predicted insignificant mode. To implement VPC, the CU is defined as one sub-mode of a band bitplane, and the CU is reordered according to the active weights. The VPC enabled JPEG 2000 VM2 is implemented as follows:

Step 1. Image transform.

Step 2. Quantization, by scalar quantizer or trellis coded quantizer (TCQ), and fixed visual weighting with the global weights wg when available.

Step 3. Setting the initial active weights w.

Step 4. Calculating the significance $s_k$ for each candidate CU as $$s_k = \begin{cases} 3^{\frac{1}{2}} \cdot 2_k^{-n} & \text{for predicted significance mode} \\ 1 \cdot 2_k^{-n} & \text{for refinement mode} \\ (0.96)^{\frac{1}{2}} \cdot 2_k^{-n} & \text{for predicted insignificance mode} \end{cases} \quad (12)$$

where $n_k$ is the current coding layer. The constants $3^{1/2}$, 1, and $0.961^{1/2}$ are designated through a coarse calculation of the R-D slope of different coding modes, and to preserve the order of embedding when visual progression is not activated.

Step 5. Calculating the visual significance for each candidate CU according to (7).

Step 6. Encoding the candidate CU with the maximum visual significance. Because there are relatively few CUs, instead of coding the changing weights, JPEG 2000 VM2 explicitly encodes the CU order. Before coding a CU, a tag is encoded which identifies the CU. Because there is a unique coding order within the band, the tag only needs to specify the band wherein the CU resides.

Step 7. Updating the active weights as necessary. The coding continues until a termination condition has been satisfied.

Visual Progressive Coding for Embedding Schemes with Coding Unit across Multiple Bands.

This section describes the implementation of VPC on Set Partitions In Hierarchical Trees (SPIHT), which includes coding symbols with coefficients across multiple bands. The implementation also may be generalized to other similar embedding schemes, such as EZW. There are three kinds of coding symbols in SPIHT: the list of insignificant pixels (LIP), the list of significant pixels (LSP), and the list of insignificant sets (LIS). The members of LIP and LSP are a single bit of a single coefficient. The members of LIS include a tree group of insignificant bits at the same coding layer across multiple bands. The CU, which is the smallest unit of VPC reordering, is defined to be one member of LIP, LSP or LIS. Because the number of CUs is large, a threshold approach similar to VPC RDE is adopted. The coding procedure of VPC enabled SPIHT is described as:

Step 1. Image transform.

Step 2. Fixed visual weighting with the global weights wg when available.

Step 3. Setting the initial threshold $\gamma = \gamma_0$ and active weights w.

Step 4. Traversing and Coding. VPC traverses the LIS, LIP and LSP, evaluates the significance and the visual significance of each CU, and encodes the CUs having a visual significance greater than $\gamma$. The significance of the CU is calculated by its quantization step size and coding mode:

$$s_k = \begin{cases} 1.9 \cdot 2_k^{-n} & \text{for members of } LIS \\ 3^{\frac{1}{2}} \cdot 2_k^{-n} & \text{for members of } LIP \\ 1 \cdot 2_k^{-n} & \text{for members of } LSP \end{cases} \quad (13)$$

where $n_k$ is still the coding layer of the CU. The constants 1.9, $3^{1/2}$ and 1 are again determined through a coarse calculation of the R-D slope of different coding modes and to preserve the order of embedding when visual progression is not activated. The visual significance of the CU is calculated by multiplying the significance of the CU with its weight. For the CU of a single bit (LIP or LSP), its weight is simply the active weight $w_i$ of band i where the pixel resides. For the CU of a member of LIS, which includes a tree of insignificant bits across multiple bands, its weight may be calculated either according to the most sensitive visual band:

$$w_{cur} = \max(w_{i_0}, w_{i_1}, \ldots, w_{i_L}) \quad (14)$$

or as a weighted sum:

$$w_{cur} = \frac{p_0 \cdot w_{i_0}(k) + p_1 \cdot w_{i_1}(k) + \ldots + p_L \cdot w_{i_L}(k)}{p_0 + p_1 + \ldots + p_L} \quad (15)$$

where $P_c$ denotes the number of pixels resides in band c, with c=0, ..., L. Method (14) is preferred because it guarantees the visual quality of the CU.

The calculated visual significance is compared with the current threshold. Only those CUs with the visual significance greater than the threshold are encoded. The coding of CU follows precisely the rule described by Said and Pearlman.

Step 5. Update weights as necessary.

Step 6. Reduce threshold: after scanning through the LIS, LIP and LSP, the threshold $\gamma$ is reduced by a factor of $\alpha$: $\gamma \leftarrow \gamma/\alpha$ and the coding goes back to Step 4. The coding continues until a termination condition has been satisfied.

Bit stream syntax of VPC

In VPC, the decoder has to be informed of any change of the active weights. There are three ways of doing this. The first way is to allow a default weight changing strategy to be negotiated between the encoder and the decoder. The default weight approach eliminates the overhead sent to the decoder, however, it also limits the flexibility of the visual progression, as the number of default weights is limited.

A more common approach is to let the encoder control the change of weights, i.e., viewing condition, during the embedding process, and to allow the decoder merely to receive and update the weights according to the instruction of the encoder. There are two ways to do this approach. When the number of coding units (CUs) is small, a tag may be encoded, which tag specifies the order of CU embedding, as the implementation of VPC in JPEG 2000 VM2. This constitutes the second way of informing the change of active weights.

For certain coders, an additional tag may be required to identify the number of bits required to encode the next CU. When the number of CUs is large, a usual approach is to explicitly send a visual mark (VM) every regular interval to inform the decoder whether the weights have changed. This is the third way of informing the change of active weights.

Figure 5:
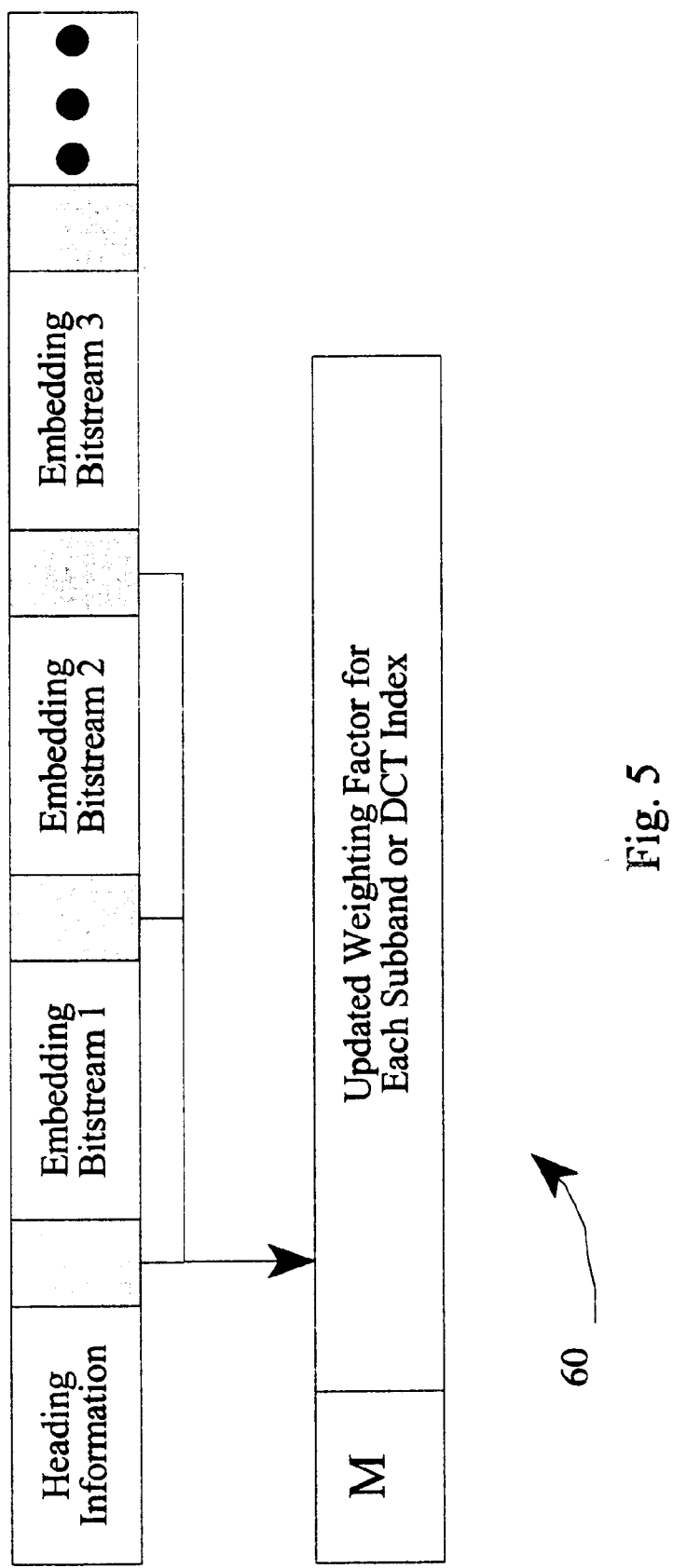
FIG. 5 is a depiction of the syntax used in the invention.

The visual mark syntax is shown in FIG. 5, generally at 60. The VM is lead by an one bit symbol M indicating whether the weights have changed. If M is '0', the previous weights remain active. In the case where M equals '1', VPC sends the updated weights for all bands. Such syntax minimizes the overhead where there is no weight change. The pre-negotiated interval for weight update is negotiated between the encoder and the decoder in advance. This can occur, for example, after coding a band bitplane, or after the scan of the entire image. The longer the weight update interval, the less the overhead for updating weights, however, the granularity of weight changing will also be more coarse.

The visual mark syntax can support quality and spatial scalability as a special case as long as there are no CUs having coefficients across multiple bands. For quality scalability, the initial weights are set to be uniformly '1', and a visual mark '0' is sent every weight update interval, indicating that the weights never change. To implement the spatial scalability, the weights for the lowest resolution are set to be all '0' and those of the remaining resolutions are set to be all '0'. Using such weights, the visual significance of coefficients residing outside the lowest resolution will be '0', so that VPC only encodes the coefficients in the lowest resolution. After all bit-planes of all coefficients in the lowest resolution have been encoded, VPC proceeds to the next lowest resolution. The weights of the new resolution are set to '1' and the weights of the remaining resolutions are set to '0'. After all coefficients of that resolution have been encoded, VPC proceeds to an even higher resolution. The process repeats until all coefficients have been encoded.

Experimental Results

Figure 6:
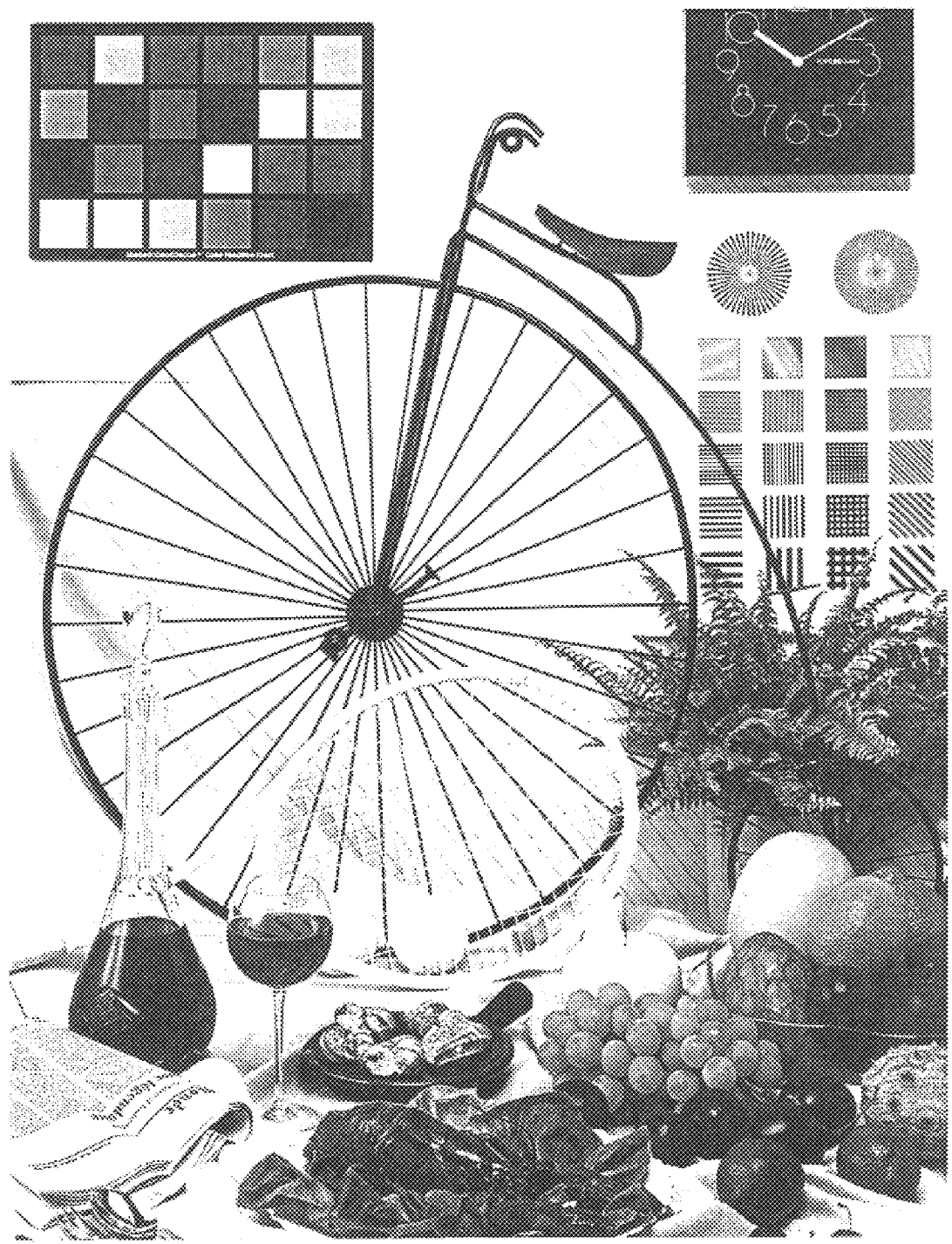
FIG. 6 is an "original" image.

The simulation software used to obtain experimental results is the JPEG 2000 VM2, with non-visual weighting mode (NW), fixed visual weighting mode (VW) and visual progression mode (VPC). The test image is the bicycle, shown in FIG. 6, with size 2048×2560. The image is compressed at 1.0 bit per pixel (bpp), and embedded/decoded at 0.125 bpp and 1.0 bpp, respectively. For the fixed visual weighting, it is assumed that the image is to be viewed at a distance about 14 inches (35 cm), and the CSF visual weights are calculated according to the method of Jones, et al., referred to hereinafter as the Jones technique. The same CSF weights are used in VPC before 0.125 bpp, and after that, the weights are set to be uniformly '1'. The resulting images are depicted in FIGS. 7, 8 and 9. For reference, the Peak Signal-to-Noise Ratio (PSNR) and Root Mean Square Error (RMSE) values of the coded image are provided in Table 1, however, the PSNR and RMSE do not provide a good measurement of the visual quality.

Figure 7A:
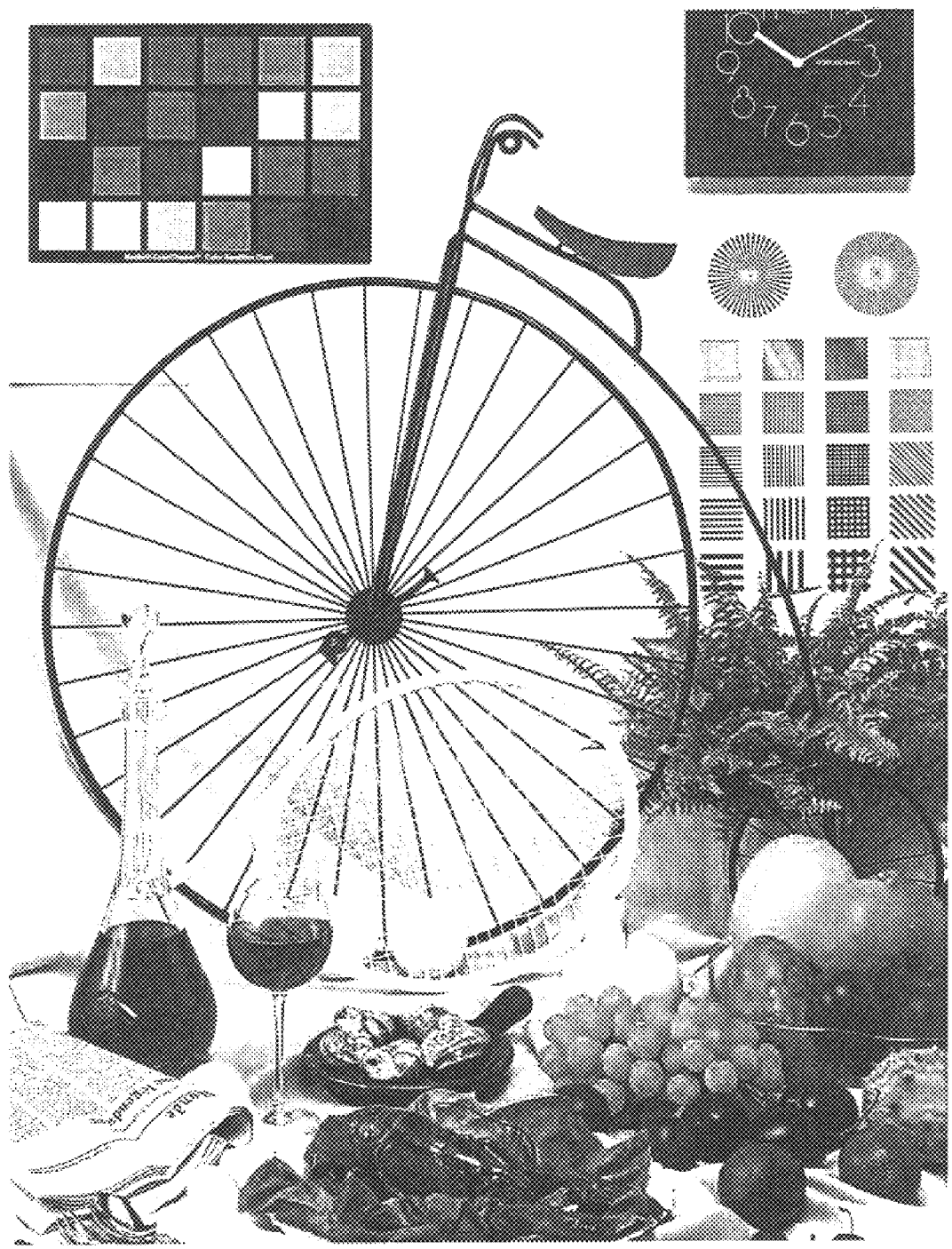
FIGS. 7, 8 and 9 are images manipulated according to the invention.
Figure 7B:
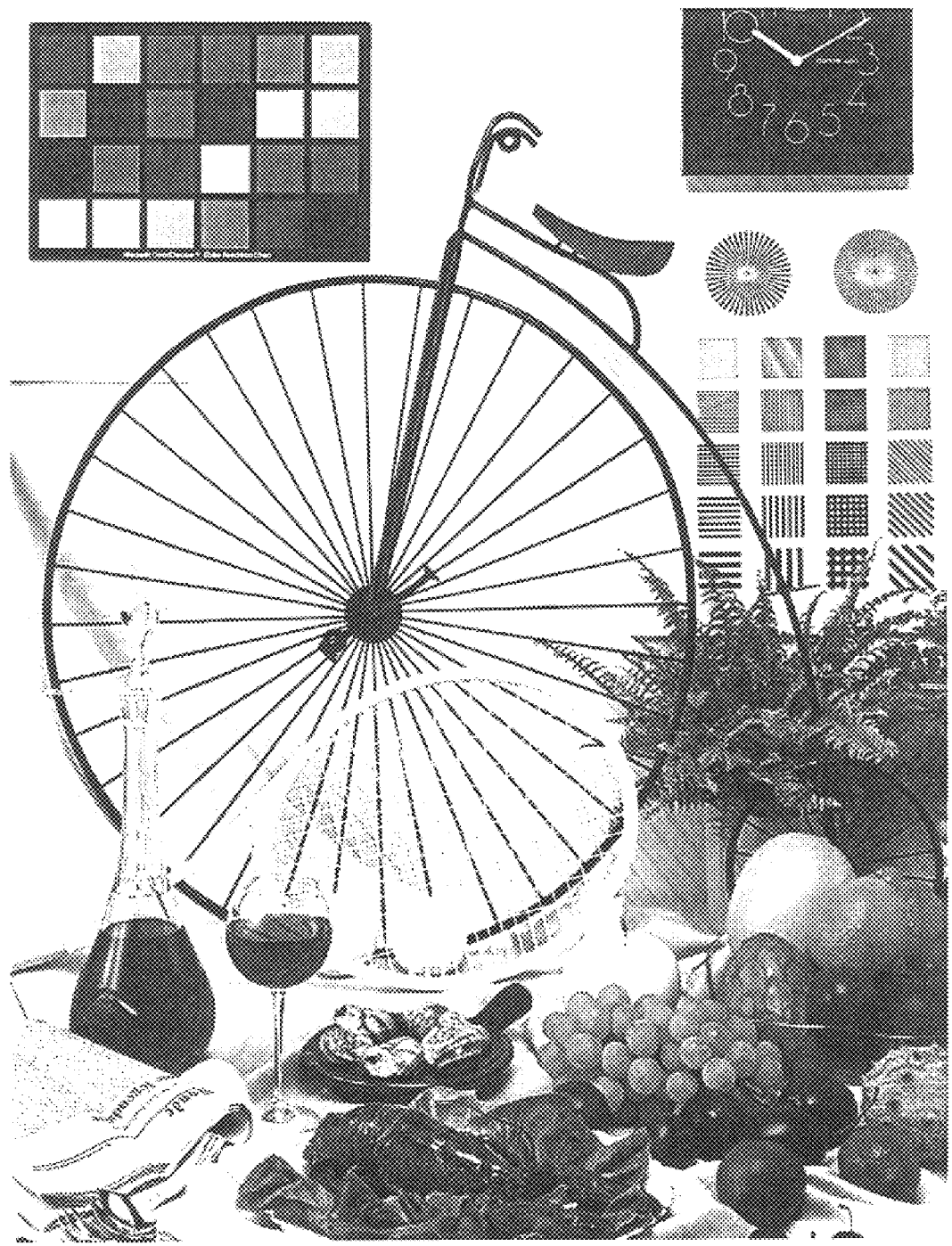
Figure 7C:
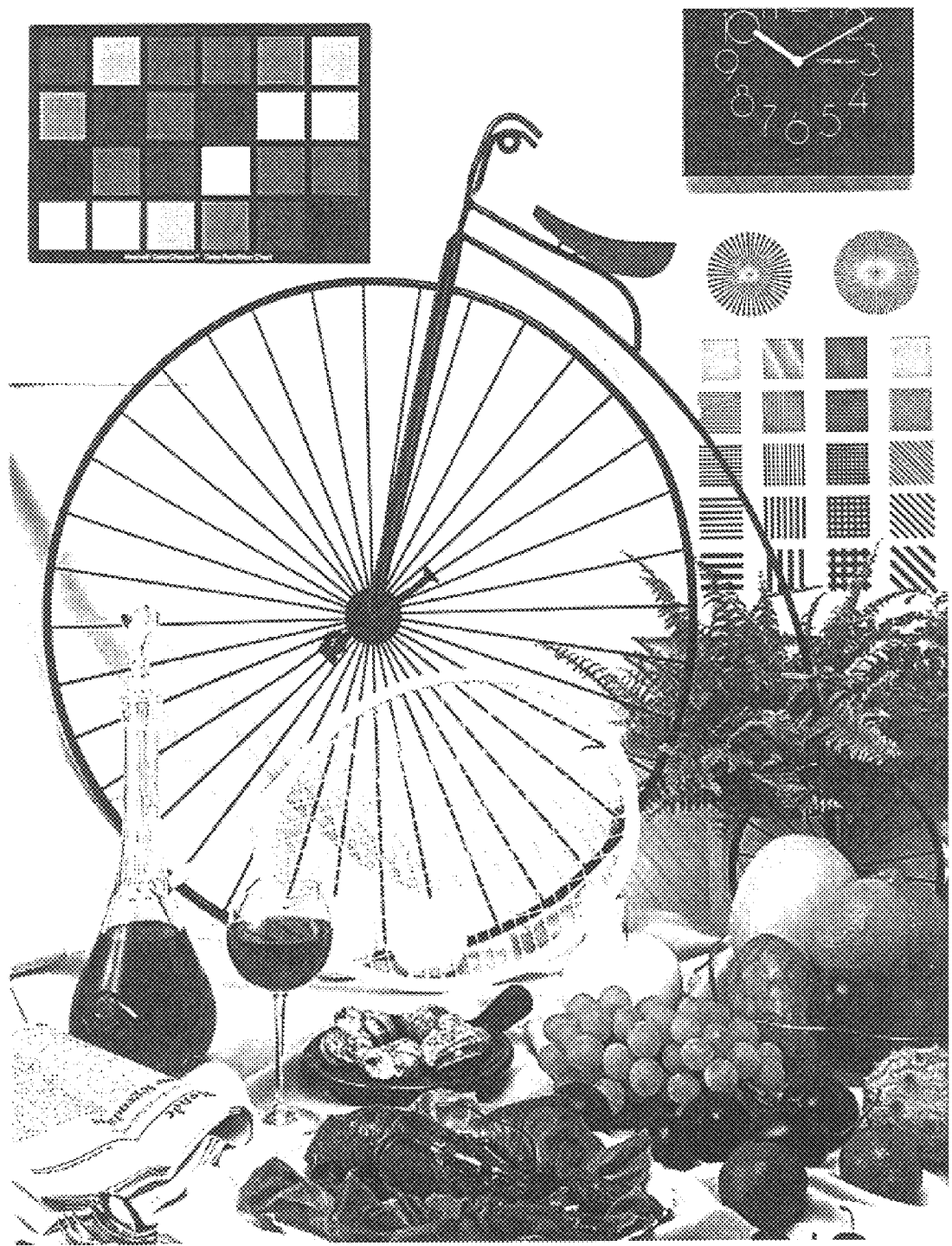

The decoded image at 0.125 bpp is shown in FIG. 7. The NW, VPC and VW coded images are shown in the top, middle and bottom row, respectively. It is easily observed that the subjective quality of the VPC, FIG. 7b, coded image is substantially better than that of NW coded image, FIG. 7a, and is close to that of VW coded image, FIG. 7c. By emphasizing the frequency component which is more perceptible to human eyes, the VPC coded images look much clear, with less ringing artifacts around the bicycle rings and bar chart. More background stripes are revealed too in VPC and VW coded images.

Figure 8A:
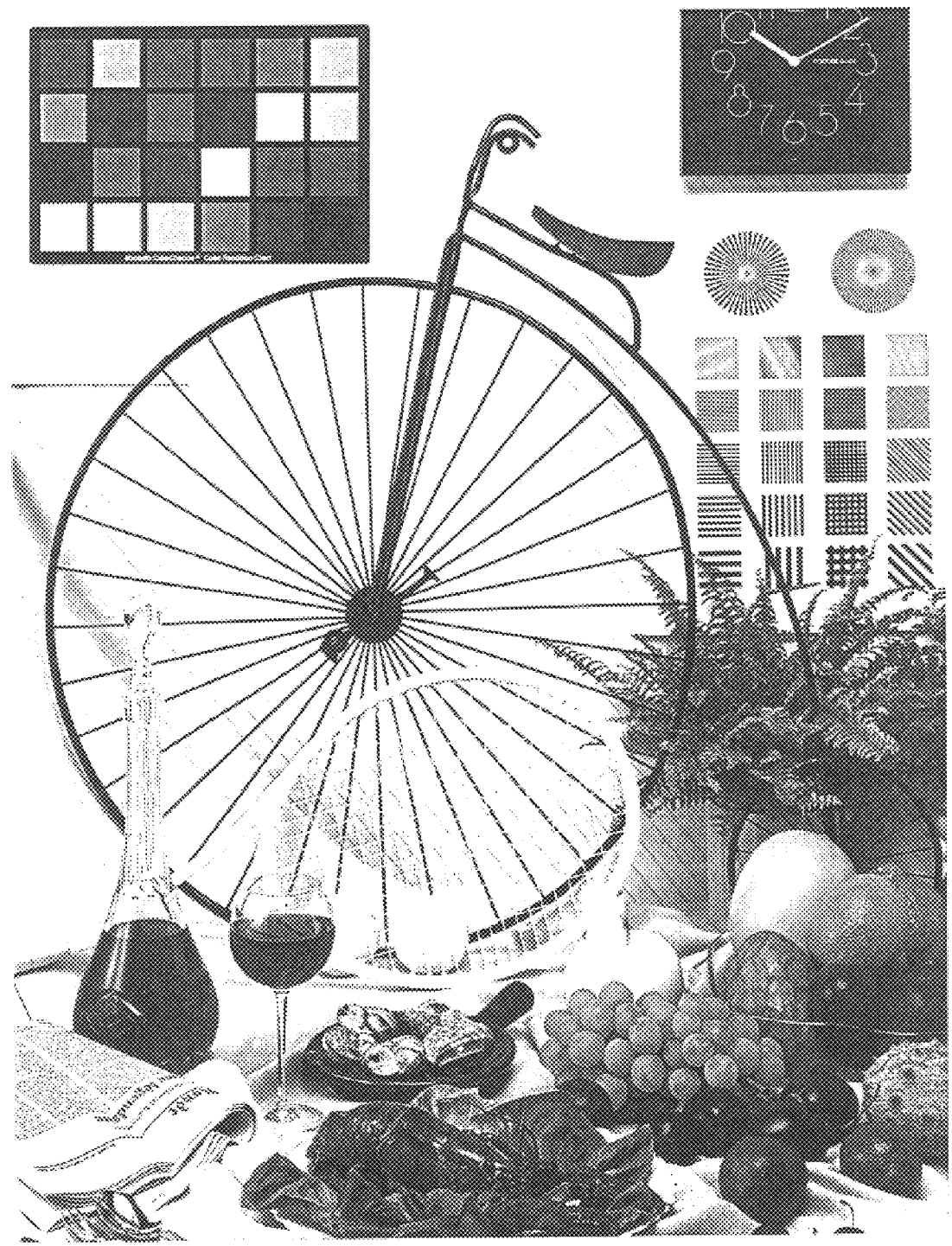
Figure 8B:
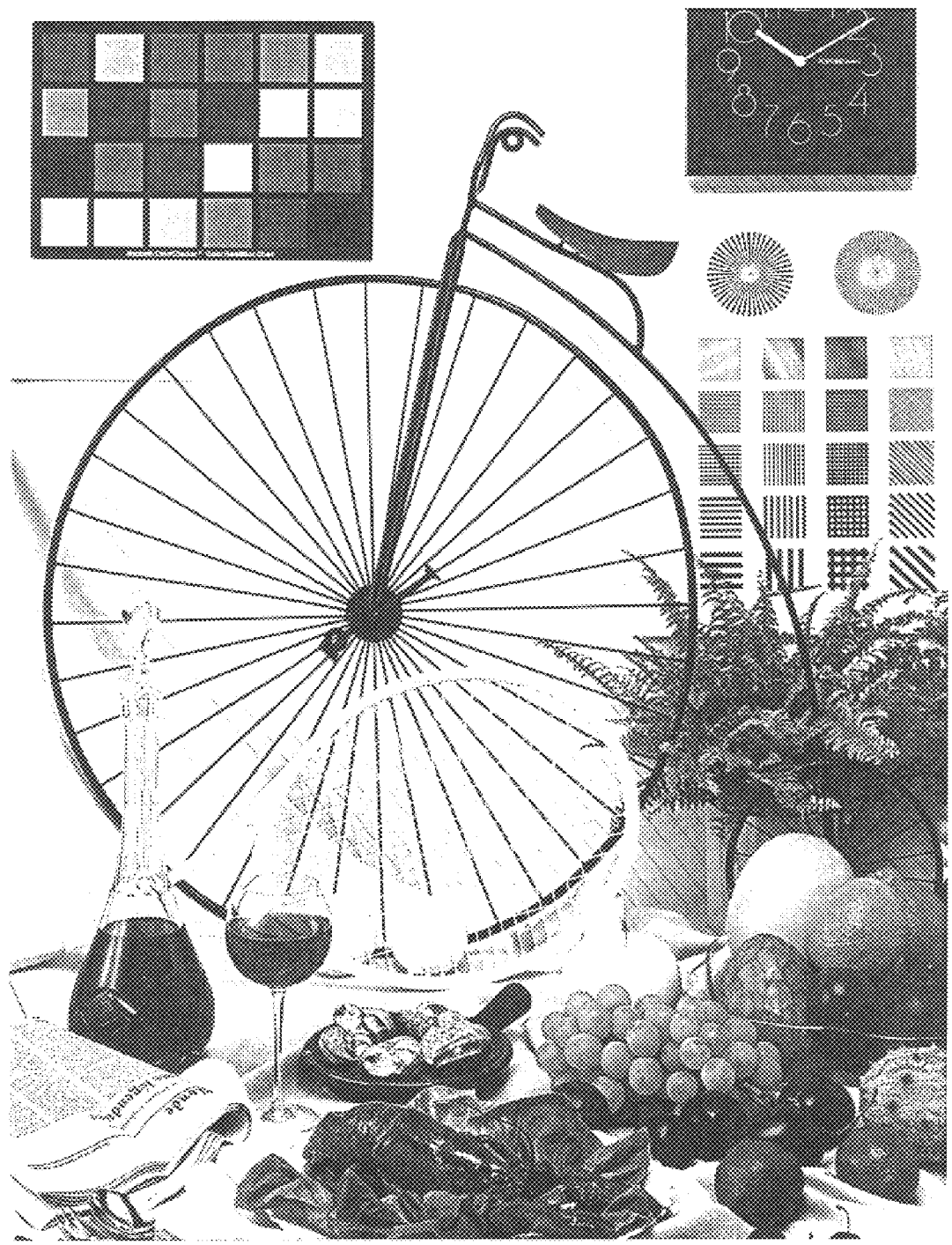
Figure 8C:
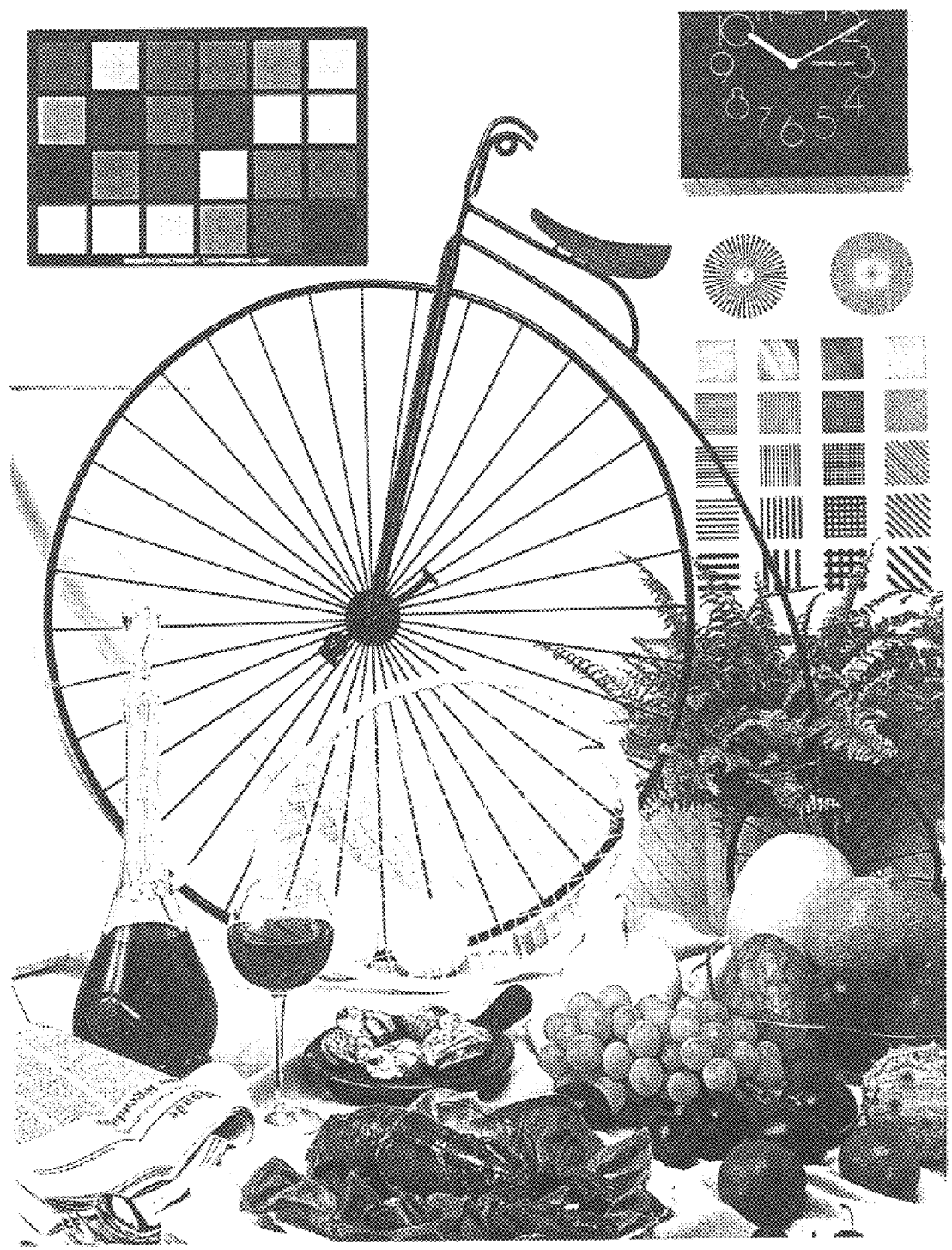
Figure 9A:
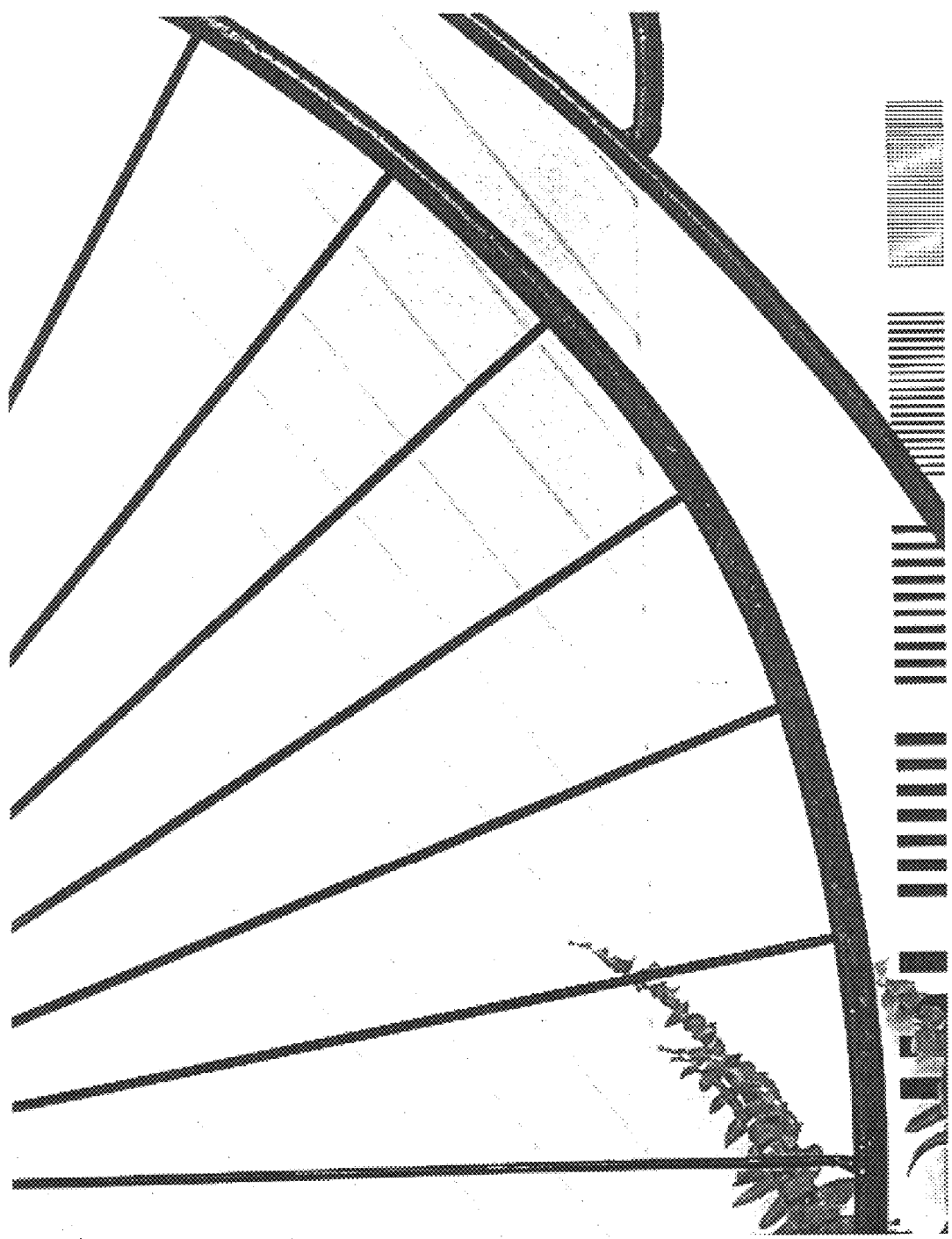
Figure 9B:
Figure 9C:
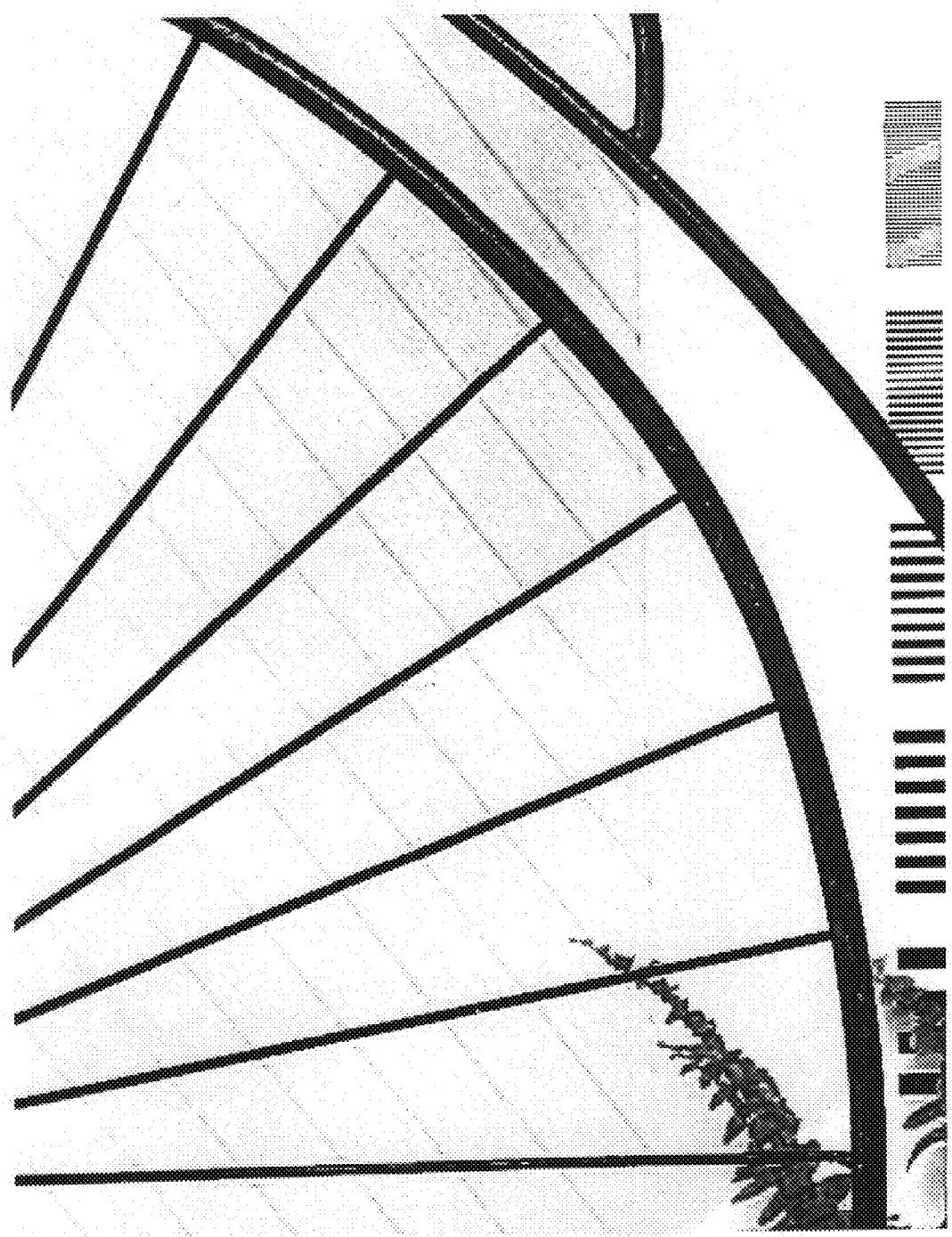

The fully decoded image at 1.0 bpp is shown in FIG. 8. All images appear very close in visual quality, whether they are coded by NW, VPC and VW, FIGS. 8a–c, respectively. However, at that high bit rate, the user may want to blow up the image for analysis. If the images are blown up 4×, as shown in FIG. 9, the VW coded image, FIG. 9c, is smoother, and has stronger ringing artifacts around sharp edges, while the VPC and NW coded images, FIGS. 9a and 9b, respectively, have fewer such artifacts. At high bitrate, the "reordering by weight" strategy of VPC makes it feasible to gradually phase out the visual weighting so that the image can be viewed at a closer distance. The VW coded image does not have such flexibility.

The VPC coded image enables more flexible adjustment of the visual weights during embedding. It takes advantage of the visual weighting at low bitrate, assigns more bits to the low pass coefficients and improves the global appearance of the image. At high bitrate, it phases out visual weighting to accomodate a more flexible viewing condition and to keep the high frequency image details. VPC improves the subjective quality of embedded coding.

TABLE 1

Bike image coded by JPEG 2000 VM2

| Coding Rate | 0.125 bpp | | 1.0 bpp | |
|---|---|---|---|---|
| | PSNR (dB) | RMSE | PSNR (dB) | RMSE |
| No Visual Weighting (NW) | 25.82 | 13.0526 | 38.12 | 3.1677 |
| Visual Progressive Coding (VPC) | 23.47 | 17.0968 | 38.11 | 3.1692 |
| Fixed Visual Weight (VW) | 23.66 | 16.7230 | 30.88 | 7.2874 |

Thus a method of visual progressive coding, and variations thereof have been disclosed. Although a preferred embodiment, and alternates thereof have been disclosed, it will be appreciated that further variations and modification may be made thereto without departing from the scope of the invention as defined in the appended claims.

I claim:

1. A method of visual progressive coding for an image comprising:

transforming the image into a set of transform coefficients;

dividing the set of transform coefficients into bands, wherein each band includes a group of transform coefficients having the same visual characteristics;

assigning a set of active weights to each band;

generating coding units;

identifying a set of candidate coding units;

determining the significance of each candidate coding unit;

determining the visual significance of each candidate coding unit;

encoding those candidate coding units having the largest visual significance; and updating the active weights.

2. The method of claim 1 wherein said transforming includes transforming by DCT and wherein each band includes coefficients having the same DCT basis.

3. The method of claim 1 wherein said transforming includes transforming by wavelet and wherein each band is a wavelet subband.

4. The method of claim 1 which further includes, after said transforming, applying fixed visual weighting with global weights.

5. The method of claim 1 wherein said updating the active weights includes sending a one bit visual mark during every pre-negotiated interval, wherein:

the visual mark is set to '0' if there is no weighting update;

the visual mark is set to '1' if the active weights change; and which includes sending updated active weights when the visual mark is '1'.

6. The method of claim 5 which includes decoding the bitstream by:

initializing a set of active weights;

generating coding units;

decoding a one bit visual mark;

updating the active weights if the visual mark is "1";

identifying a set of candidate coding units;

determining the significance of all the candidate coding units;

determining the visual significance of all the candidate coding units;

decoding the coding unit with the maximum visual significance;

inversely fixing the visual weight set with the global weighting set wg; and inverse transforming the image to space domain.

7. The method of claim 1 wherein said encoding includes encoding a tag identifying the next coding unit to be encoded, and encoding the coding bitstream of the next coding unit.

8. The method of claim 7 which further includes encoding a tag identifying the number of bits required to encode the next coding unit.

9. The method of claim 1 which includes negotiating a default weight changing strategy between the encoder and the decoder during visual progressive coding.

10. The method of claim 9 wherein said generating a coding unit includes generating a coding unit for each bit of a transform coefficient, and wherein said encoding includes determining the significance of a coding unit by RDE and encoding the coding unit by RDE.

11. The method of claim 10 wherein said encoding includes:

setting an initial threshold $\gamma = \gamma_0$;

calculating a band threshold $$\gamma'_i = \frac{\gamma^2}{w_i^2}$$

encoding said coding unit with significance above the band threshold $\gamma'_i$; and reducing threshold $\gamma$ by a factor of $\alpha: \gamma \leftarrow \gamma/\alpha$.

12. The method of claim 1 wherein said generating coding units includes generating a coding unit for a partial bitplane of a bitplane band, wherein the partial bitplane is in a mode taken from the group of modes consisting of predicted significance mode, refinement mode and predicted insignificance mode; and wherein said encoding includes encoding the coding unit by JPEG 2000 VM2.

13. The method of claim 1 which includes setting a termination criterion.

14. The method of claim 1 wherein said generating coding units includes generating a coding unit for each member of a LIP, LSP and LIS; and wherein said encoding further includes traversing the LIS, LIP and LSP, and encoding the coding unit by SPIHT.

15. The method of claim 1 wherein said determining the visual significance includes determining the significance $s_k$ for each candidate CU as $$s_k = \begin{cases} 3^{\frac{1}{2}} \cdot 2_k^{-n} & \text{for predicted significance mode} \\ 1 \cdot 2_k^{-n} & \text{for refinement mode} \\ (0.96)^{\frac{1}{2}} \cdot 2_k^{-n} & \text{for predicted insignificance mode,} \end{cases}$$

where $n_k$ is the current coding layer.

16. The method of claim 1 wherein said determining the significance includes identifying a list of insignificant pixels (LIP), a list of significant pixels (LSP), and a list of insignificant sets (LIS); traversing the LIS, LIP and LSP, wherein the significance of the coding unit is determined by $$s_k = \begin{cases} 1.9 \cdot 2_k^{-n} & \text{for members of } LIS \\ 3^{\frac{1}{2}} \cdot 2_k^{-n} & \text{for members of } LIP \\ 1 \cdot 2_k^{-n} & \text{for members of } LSP \end{cases}$$

where $n_k$ is the coding layer of the CU.

17. The method of claim 1 wherein said determining visual significance includes multiplying significance by the weight of a coding unit.

18. The method of claim 17 wherein the weight of a coding unit is the weight of the subband in which the coding unit resides when the coding unit resides in a single subband; and the weight of the coding unit is the weighted sum of all subbands in which the coding unit resides when the coding unit occupies more than a single subband.

19. The method of claim 18 wherein said transforming includes using one bit of a transform coefficient as a coding unit, and which further includes, after said transforming, setting a global visual weight wg; and wherein said encoding includes:

encoding by RDE;
setting an initial threshold $\gamma = \gamma_0$;
calculating a band threshold $$\gamma'_i = \frac{\gamma^2}{w_i^2}$$

encoding said coding unit with significance above the band threshold $\gamma'_i$;
determining the significance of a coding unit by RDE;
scanning all bands and all coefficients; and
reducing threshold $\gamma$ by a factor of $\alpha$: $\gamma \leftarrow \gamma/\alpha$.

20. The method of claim 17 wherein said assigning a set of active weights includes setting the weight of a coding unit to the weight of the subband in which the coding unit resides when the coding unit resides in a single subband; and setting the weight of the coding unit to the maximum weight of all subbands in which the coding unit resides when the coding unit occupies more than a single subband.

21. The method of claim 1 wherein said encoding includes determining a coding order according to the visual significance assigned to a coding unit.

22. The method of claim 1 wherein said determining a visual weight includes setting a viewing distance, and determining a CSF weight as done by the Jones technique.

23. A method of visual progressive coding for an image comprising:

transforming the image into a set of transform coefficients, wherein each transform coefficient includes multiple bits, wherein at least one of said multiple bits is a coding unit; and wherein the set of transform coefficients is divided into bands, wherein each band includes a group of transform coefficients having the same visual characteristics;

assigning a set of active weights to each band;

determining a visual significance for each coding unit by multiplying the significance of each coding unit by the active weight assigned to the band in which the coding unit resides;

encoding the coding units in descending order of visual significance;

updating the active weights until a weight update interval is reached; and terminating the process when a terminating condition is satisfied.

24. The method of claim 23 which includes setting a termination criterion.

25. The method of claim 23 wherein said determining the significance includes determining the significance $s_k$ for each candidate CU as $$s_k = \begin{cases} 3^{\frac{1}{2}} \cdot 2_k^{-n} & \text{for predicted significance mode} \\ 1 \cdot 2_k^{-n} & \text{for refinement mode} \\ (0.96)^{\frac{1}{2}} \cdot 2_k^{-n} & \text{for predicted insignificance mode,} \end{cases}$$

where $n_k$ is the current coding layer.

26. The method of claim 23 wherein said determining the significance includes identifying a list of significant pixels (LIP), a list of singificant pixels (LSP), and a list of insignificant sets (LIS); traversing the LIS, LIP, and LSP, wherein the significance of the coding unit is determined by $$s_k = \begin{cases} 1.9 \cdot 2_k^{-n} & \text{for members of } LIS \\ 3^{\frac{1}{2}} \cdot 2_k^{-n} & \text{for members of } LIP \\ 1 \cdot 2_k^{-n} & \text{for members of } LSP \end{cases}$$

where $n_k$ is the coding layer of the CU.

\* \* \* \* \*